3,235,552
2,7-DI-(TERTIARY AMINOALKYLENE)-2,7-DIHY-
DROANTHRA-[1:9-5:10]-DIPYRAZOLES
Siegismund Schütz and Ernst Schraufstätter, Wuppertal-Elberfeld, and Marianne Bock, Wuppertal-Sonnborn, Germany, assignors to Farbenfabriken Bayer Aktiengesellschaft, Leverkusen, Germany, a corporation of Germany
No Drawing. Filed Feb. 9, 1962, Ser. No. 172,074
Claims priority, application Germany, Feb. 20, 1961,
F 33,241
10 Claims. (Cl. 260—246)

This invention relates to novel substituted anthradipyrazoles and to process for the preparation thereof. More particularly, the present invention relates to pharmacologically active, basically substituted anthradipyrazoles and methods for their production; the novel compounds of the invention being of the formula:

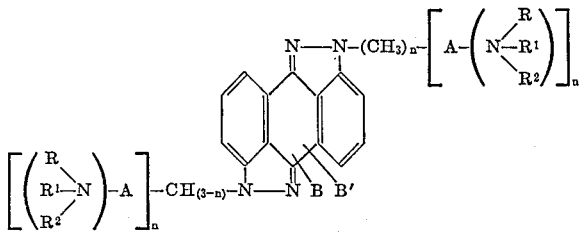

wherein A is a straight or branched chain alkylene radical of from 1 to 4 carbon atoms which may be substituted optionally by an oxy, hydroxy or acetoxy group; each of B and B' denotes a hydrogen atom, a halogen atom, or a nitro, sulfo, carboxy, alkyl, sulfonamido, carboxylic acid amido, acetamino, or benzylamino radical; R and R¹ are hydrogen atoms, alkyl radicals, or simultaneously, alkylene radicals joined to each other at a point remote from their attachment to the nitrogen atom positioned more nearly adjacent the pyrazole nucleus, said joining being effected either directly or by means of a nitrogen, sulfur or oxygen moiety; R² is a methyl radical or a valence connecting the nitrogen atom to the alkylene moiety represented by A, provided that when R² is a methyl radical, the moiety RR¹R²N is connected to A by a valence of one of the radicals R and R¹; and n is an integer of from 1 to 2. These compounds, when administered as such, as well as in the form of their organic and inorganic salts, are particularly useful in the treatment of amoebic infections (e.g., amoebic dysentery and the like in warm blooded animals).

Illustrative of the novel compounds of the invention are 2,7-di-(β-dimethylaminoethyl) - 2,7 - dihydroanthra-[1:9-5:10]-dipyrazole, 2,7-di-(γ-dimethylaminopropyl)-2,7-dihydroanthra-[1:9-5:10]-dipyrazole, 2,7-di-[1,3 - bis-(diethylamino)-propyl-(2)] - 2,7-dihydroanthra - [1:9-5:10]-dipyrazole, 2,7-di[γ-morpholinopropyl]-2,7 - dihydroanthra-[1:9-5:10]-dipyrazole, 2,7-di-(β - morpholinoethyl)-2,7-dihydroanthra-[1:9-5:10]-dipyrazole, 2,7 - di-[β-(N-methyl-α-piperodyl)-ethyl] - 2,7 - dihydroanthra-[1:9-5:10]-dipyrazole, 2,7-di-[β-(N-methylpiperazino)-propyl]-2,7-dihydroanthra-[1:9-5:10]-dipyrazole, 2,7 - di-[β-pyrrolidinopropyl]-2,7 - dihydroanthra - [1:9-5:10]-dipyrazole and 2,7-di-(γ-diethylamino-β-oxypropyl)-2,7-dihydroanthra-[1:9-5:10]dipyrazole.

The novel compounds of the invention are prepared by reaction of an anthradipyrazole of the formula:

(II) 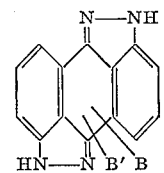

with an alkyl halide of the formula:

(III) 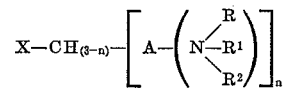

wherein X is a halogen atom and each of A, B, B', R, R¹, R² and n is as defined above; or by reaction of an anthradipyrazole selected from the formulae:

(IV) 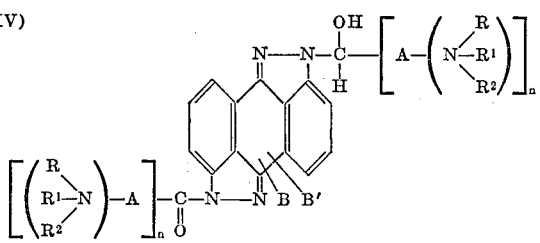

and (V)

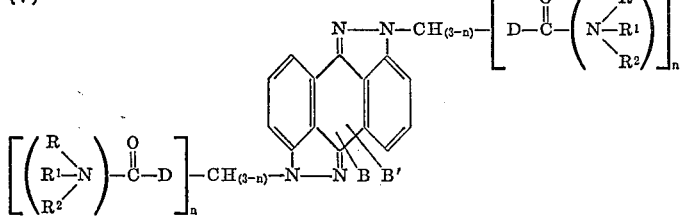

wherein each of the aforesaid formulae each of A, B, B', R, R¹, R² and n is as defined above, D is an alkylene chain, straight or branched, containing from 1 to 3 carbon atoms, and capable of being substituted in a manner similar to A defined above; with a catalytic reducing agent, such as lithium aluminum hydride, which is, in fact, preferred; or by reaction of an anthrapyrazole of the formula:

(VI) 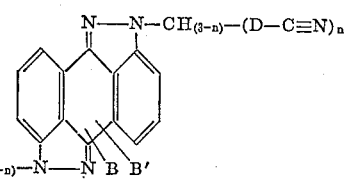

wherein each of B, B', D' and n is as described above: with a hydrogenation catalyst, e.g., lithium aluminum hydride, in the presence, optionally, of a secondary amine; or by reaction of an anthraquinone substituted by a halogen atom at each of the 1–C and 5–C carbon positions, and having the formula:

(VII)

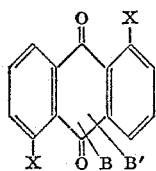

with a compound of the formula:

(VIII)

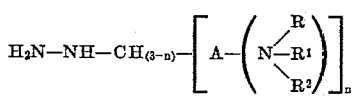

wherein each of the above formulae, A, B, B', R, $R^1$, $R^2$, X and n is as described above.

The following examples are further illustrative of the invention.

Example 1

Preparation of the compound, 2,7-di-(β-dimethylaminoethyl)-2,7-dihydroanthra-[1:9–5:10] - dipyrazole, of the formula:

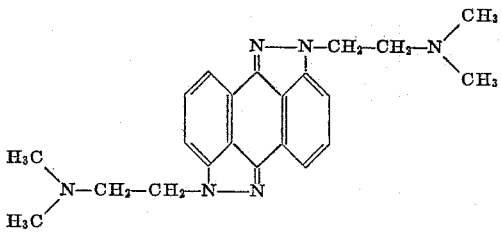

12 grams of 2,7-dihydroanthra-[1:9–5:5:10] - dipyrazole are dissolved in 70 cubic centimeters of absolute alcohol; 2.4 grams of sodium are then introduced and the suspension is stirred until the sodium is dissolved. 33 grams of β-dimethyl-aminoethyl chloride are added dropwise at room temperature, the mixture is heated at boiling for 1½ hours (90 minutes) and then evaporated to dryness. The residue is dissolved in dilute acetic acid and the solution is then rendered alkaline and shaken with chloroform. After drying and evaporating the chloroform solution, 2,7-di-(β-dimethylaminoethyl) - 2,7 - dihydroanthra-[1:9–5:10]-dipyrazole is obtained in a good yield as an oil which crystallizes as in the form of its maleate and can be purified by redissolution from methanol/ether. Orange-yellow crystals are obtained which melt at 211° C.–213° C. with decomposition.

$C_{22}H_{26}N_6+C_8H_8O_8$ (606.6)—Calculated: C, 59.40; H, 5.66; N, 13.87. Found: C, 59.10, 58.95; H, 5.66, 5.81; N, 13.90.

Example 2

Preparation of the compound, 2,7-di(γ-dimethylaminopropyl)-2,7-dihydroanthra-[1:9–5:10] - dipyrazole of the formula:

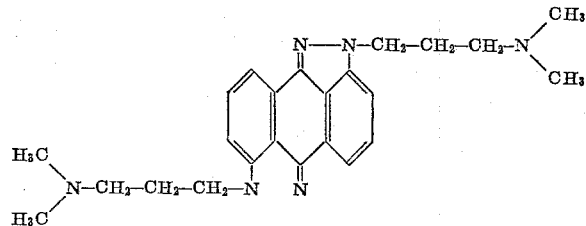

24 grams of 2,7-dihydroanthra-[1:9–5:10]-dipyrazole are suspended in 150 cc. of absolute alcohol; 4.5 grams of sodium are then introduced therein and dissolved and 22 grams of γ-dimethylaminopropyl chloride are added dropwise. The mixture is boiled for 90 minutes and worked up as described in Example 1. The naphthalene 1,5-disulphonate of 2,7-di-(γ-dimethylaminopropyl)-2,7-dihydroanthra-[1:9–5:10]-dipyrazole is obtained in a good yield and can be redissolved in aqueous ethanol/ether. The product compound crystallizes with one mol of water.

$C_{24}H_{30}N_6+C_{10}H_8O_6S_2+H_2O$ (708.8)—Calculated: C, 57.61; H, 5.69; N, 11.85; S, 9.04. Found: C, 57.08; H, 6.05; N, 11.99; S, 9.30.

Example 3

(a) Preparation of the compound, 2,7-di-[1,3-bis-(diethylamino) - propyl-(2)]-2,7-dihydroanthra-[1:9-5:10]-dipyrazole of the formula:

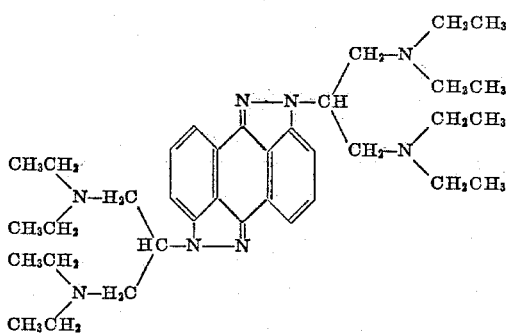

Into a suspension of 27 grams of 2,7-dihydroanthra-[1:9-5:10]-dipyrazole in 210 cubic centimeters of absolute alcohol, 5.4 grams of sodium are introduced and dissolved. 67.5 grams of 1,3-bis-(diethylamino)-propyl chloride-(2) are subsequently added dropwise and the mixture boiled under reflux for 4 hours. The reaction product is subjected to steam distillation and the residue taken up in chloroform. The chloroform solution is shaken with dilute acetic acid; the acetic acid solution is rendered alkaline and the product extracted with chloroform. After drying and evaporating the chloroform solution, 58 grams of 2,7-di-[1,3-bis-(diethylamino)-propyl-(2)] - 2,7 - dihydroanthra - [1:9-5:10]-dipyrazole are obtained as a viscous oil which crystallizes as naphthalene-1,5-disulphonate from ethanol/ether or acetone.

$C_{36}H_{56}N_8+2(C_{10}H_8S_2O_6)$ (1177.5)—Calculated: N, 9.52; S, 10.88. Found: N, 9.23; S, 10.17.

(b) 2,7 - di-[γ-morpholino-propyl]-2,7-dihydroanthra-[1:9-5:10]-dipyrazole, of the formula:

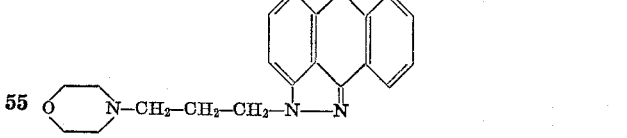

$C_{28}H_{34}N_6O_2+2(C_6H_8O_7)$ (870.83)—Calculated: C, 55.17; H, 5.78; N, 9.65. Found: C, 54.68; H, 6.08; N, 9.75.

(c) 2,7 - di - (β-morpholinoethyl)-2,7-dihydroanthra-[1:9-5:10]-dipyrazole, of the formula:

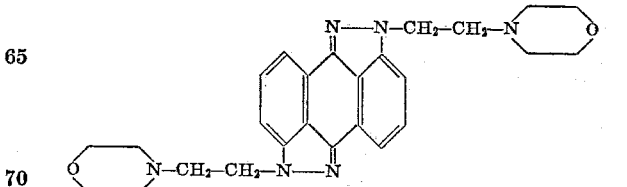

which forms orange crystals; melting point 181° C.–184° C.

$C_{26}H_{30}N_6O_2$ (458.5)—Calculated: C, 68.10; H, 6.60; N, 18.33. Found: C, 68.21; H, 6.89; N, 17.76.

(d) 2,7 - di - [β-(N-methyl-α-piperidyl)-ethyl]-2,7-dihydroanthra-[1:9-5:10]-dipyrazole, of the formula:

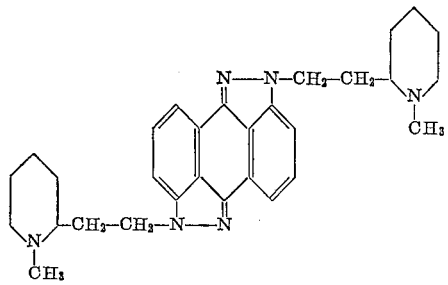

which forms a salicylate:

Salicylate $C_{30}H_{38}N_6 + 2(C_7H_6O_3)$ (758.9)—Calculated: N, 11.07; O, 12.65. Found: N, 10.58; O, 12.51.

(e) 2,7 - di - [β-(N-methylpiperazino)-propyl-2,7-dihydroanthra-[1:9-5:10]-dipyrazole, of the formula:

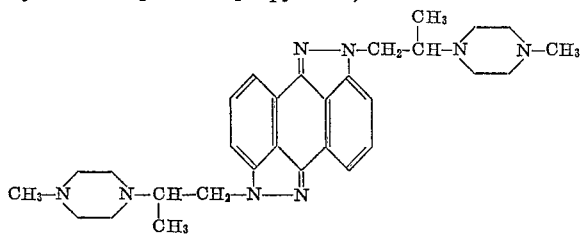

which yields yellow crystals, melting point 201° C.–202° C.

$C_{30}H_{40}N_8$ (512.7)—Calculated: N, 21.86. Found: 21.89.

(f) 2,7 - di - [β-pyrrolidinopropyl]-2,7-dihydroanthra-[1:9-5:10]-dipyrazole, of the formula:

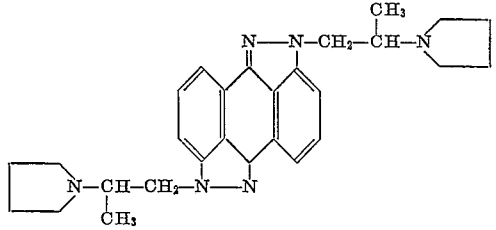

This latter compound forms yellow crystals.

$C_{28}H_{34}N_6$ (454.6)—Calculated: N, 18.48. Found: N, 18.61.

*Example 4*

Preparation of the compound, 2,7-di-(γ-diethylamino-β-oxypropyl)-2,7-dihydroanthra-[1:9-5:10]dipyrazole of the formula:

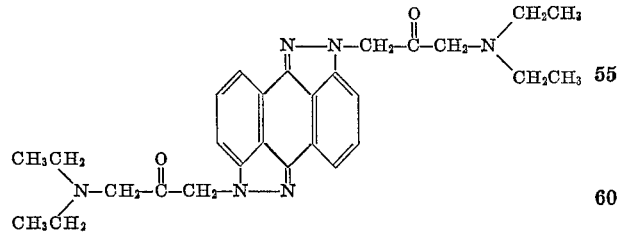

20 grams of 1,5-dichloranthraquinone, 150 cc. of ethanol, 20 g. of triethylamine, 10 cc. of pyridine and 30 grams of 3-diethylamino-2-oxypropylhydrazine are boiled under reflux for 60 hours after the addition of a pinch of copper chloride. The mixture is then evaporated to dryness, the residue taken up in dilute acetic acid, extracted with chloroform, and the acetic acid solution rendered alkaline. The alkaline solution is shaken with chloroform, the chloroform solution dried and concentrated by evaporation. 2,7-di - (γ-diethylamino-β-oxypropyl)-2,7-dihydroanthra-[1:9-5:10]-dipyrazole crystallizes from ethyl acetate and can be recrystallized from acetone. Orange crystals are obtained of M.P. 154° C.–156° C.

$C_{28}H_{38}N_6O_2$ (490.62)—Calculated: N, 17.13; O, 6.52. Found: N, 16.67; O, 6.83.

What is claimed is:

1. The compound, 2,7-di-(β-dimethylaminoethyl)-2,7-dihydroanthra-[1:9-5:10]-dipyrazole.
2. The compound, 2,7-di-(γ-dimethylaminopropyl)-2,7-dihydroanthra-[1:9-5:10]-dipyrazole.
3. The compound, 2,7-di-[1,3-bis-(diethylamino)-propyl-(2)-]-2,7-dihydroanthra-[1:9-5:10]-dipyrazole.
4. The compound, 2,7-di-[γ-morpholinopropyl]-2,7-dihydroanthra-[1:9-5:10]-dipyrazole.
5. The compound, 2,7-di-(β-morpholinoethyl)-2,7-dihydroanthra-[1:9-5:10]-dipyrazole.
6. The compound, 2,7-di-[β-(N-methyl-α-piperidyl)-ethyl]-2,7-dihydroanthra-[1:9-5:10]-dipyrazole.
7. The compound, 2,7-di-[β-N-methylpiperazino-propyl]-2,7-dihydroanthra-[1:9-5:10]-dipyrazole.
8. The compound, 2,7-di-[β-pyrrolidinopropyl]-2,7-dihydroanthra-[1:9-5:10]-dipyrazole.
9. The compound, 2,7-di-(γ-diethylamino)-β-hydroxypropyl-2,7-dihydroanthra-[1:9-5:10]-dipyrazole.
10. A chemical compound selected from the group consisting of 2,7-di-(β-dimethylaminoethyl)-2,7 - dihydroanthra-[1:9-5:10]-dipyrazole; 2,7-di-(γ-dimethylaminopropyl)-2,7-dihydroanthra-[1:9-5:10]-dipyrazole; 2,7-di-[1,3-bis-(diethylamino)-propyl-(2)] - 2,7 - dihydroanthra-[1:9-5:10]-dipyrazole; 2,7-di-[γ-morpholinopropyl]-2,7-dihydroanthra-[1:9-5:10]-dipyrazole; 2,7-di-(β-morpholinoethyl)-2,7-dihydroanthra-[1:9 - 5:10] - dipyrazole; 2,7-di-[β-(N-methyl-α-piperidyl)-ethyl] - 2,7 - dihydroanthra-[1:9-5:10]dipyrazole; 2,7-di-[β-N-methylpiperazinopropyl]-2,7-dihydroanthra-[1:9-5:10]-dipyrazole; 2,7-di-[β-pyrrolidinopropyl]-2,7-dihydroanthra-[1:9 - 5:10] - dipyrazole; and 2,7-di-(γ-diethylamino-β-hydroxypropyl)-2,7-dihydroanthra-[1:9-5:10]-dipyrazole.

References Cited by the Examiner
UNITED STATES PATENTS
3,097,209  7/1963  Janssen _____ 260—247.5

NICHOLAS S. RIZZO, *Primary Examiner.*

DUVAL T. McCUTCHEN, *Examiner.*

UNITED STATES PATENT OFFICE
CERTIFICATE OF CORRECTION

Patent No. 3,235,552                                         February 15, 1966

Siegismund Schütz et al.

It is hereby certified that error appears in the above numbered patent requiring correction and that the said Letters Patent should read as corrected below.

Column 2, lines 26 to 35, for that portion of the formula reading

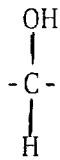        read       

column 5, lines 52 to 61, for that portion of the formula, each occurrence, reading

        read       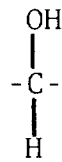

Signed and sealed this 24th day of January 1967.

(SEAL)
Attest:

ERNEST W. SWIDER                                EDWARD J. BRENNER
Attesting Officer                                Commissioner of Patents